US006575431B2

(12) United States Patent
Artsvelyan

(10) Patent No.: US 6,575,431 B2
(45) Date of Patent: *Jun. 10, 2003

(54) WEIR-TYPE DIAPHRAGM VALVE WITH RAISED ARCUATE BEAD

(75) Inventor: Albert Artsvelyan, La Crescenta, CA (US)

(73) Assignee: Spears Manufacturing Co., Sylmar, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/395,538

(22) Filed: Sep. 14, 1999

(65) Prior Publication Data

US 2001/0032958 A1 Oct. 25, 2001

(51) Int. Cl.$^7$ ................................................ F16K 7/16
(52) U.S. Cl. ..................................................... 251/331
(58) Field of Search ........................................ 251/331

(56) References Cited

U.S. PATENT DOCUMENTS

| | | | | |
|---|---|---|---|---|
| 2,283,369 A | * | 5/1942 | Jacobsen | 251/331 |
| 2,397,373 A | * | 3/1946 | Saunders | 251/331 |
| 3,091,427 A | * | 5/1963 | Boteler | 251/331 X |
| 3,154,286 A | * | 10/1964 | McFarland, Jr. | 251/331 |
| 3,198,205 A | * | 8/1965 | Boteler | 251/331 X |
| 3,310,281 A | * | 3/1967 | Boteler | 251/331 |
| 3,349,795 A | * | 10/1967 | Matsutani | 251/331 X |
| 3,623,700 A | * | 11/1971 | Boteler | 251/331 |
| 3,628,770 A | * | 12/1971 | Rost | 251/331 |
| 3,802,462 A | * | 4/1974 | Trosch | 251/331 X |
| 4,051,865 A | * | 10/1977 | Cocking et al. | 251/331 X |
| 4,316,482 A | * | 2/1982 | Pearce et al. | 251/331 X |
| 4,505,451 A | * | 3/1985 | Jonas | 251/331 X |
| 4,545,565 A | * | 10/1985 | Sano et al. | 251/331 |
| 4,901,751 A | * | 2/1990 | Story et al. | 251/331 X |
| 5,277,401 A | * | 1/1994 | Butler et al. | 251/331 X |
| 5,279,328 A | * | 1/1994 | Linder et al. | 251/331 X |
| 5,377,956 A | * | 1/1995 | Muller | 251/331 |

* cited by examiner

*Primary Examiner*—Ehud Gartenberg
*Assistant Examiner*—Eric Keasel
(74) *Attorney, Agent, or Firm*—Denton L. Anderson; Sheldon & Mak

(57) ABSTRACT

A weir-type diaphragm valve having a valve body, a flexible diaphragm and a valve stem. The valve body has an inlet end, an outlet end and an internal flow path disposed between the inlet end and the outlet end. Within the valve body is a weir disposed transverse to the flow path. Along the top edge of the weir is disposed a raised bead extending substantially along the entire length of the top edge of the weir. The flexible diaphragm is disposed above the valve seat. The diaphragm is flexible between a closed diaphragm position wherein the diaphragm is in tight abutment with the valve seat (so that the valve path is sealed closed) and an open diaphragm position wherein the diaphragm is spaced apart from the valve seat (so that the valve path is open). The valve stem and handle assembly is adapted to alternatively flex the diaphragm between the closed diaphragm position and the open diaphragm position.

18 Claims, 3 Drawing Sheets

WEIR-TYPE DIAPHRAGM VALVE WITH RAISED ARCUATE BEAD

FIELD OF THE INVENTION

This invention relates generally to valves and, more specifically, to weir-type diaphragm valves.

BACKGROUND OF THE INVENTION

Diaphragm valves have been in common use for many years. Diaphragm valves are most commonly used in applications where contact between the flowing fluid and the interior materials within an ordinary valve are not compatible. Accordingly, diaphragm valves are frequently used where the flowing fluid is corrosive to the interior parts of ordinary valves or where the flowing fluid might be contaminated by contact with the interior parts of ordinary valves.

One of the most common types of diaphragm valves are weir-type diaphragm valves. In this type of diaphragm valves, the flowing fluid within the valve flows over a generally vertical weir disposed transverse to the flow path within the valve. An elastomeric diaphragm is affixed in a generally horizontal position spaced apart from the top of the weir. When the valve is to be closed, a vertical plunger disposed above the diaphragm is operated to press down upon the diaphragm so as to seal the diaphragm against the top of the weir. In such weir-type diaphragm valves, a transverse bead is commonly disposed on the underside of the diaphragm in such a way that the bead mates with the top of the weir. This is illustrated in FIGS. 4–7 of the drawings. It has been found that diaphragms having such a transverse bead provide a more positive seal than do diaphragms without a transverse bead.

Unfortunately, there is a problem with the use of such prior art weir-type diaphragm valves having a transverse bead on the underside of the diaphragm. Because the diaphragm is made from an elastomeric material, fluid pressure against the bead when the valve is in the closed position tends to push the bead in the downstream direction. The elastomeric material in the upstream portion of the diaphragm is stretched, while the elastomeric material within the downstream portion of the diaphragm is compressed. Where the fluid pressure is relatively high and/or after repeated uses of the valve in the closed position, the transverse bead can be displaced off of the top of the weir altogether, as illustrated in FIG. 7. When this occurs, the diaphragm no longer adequately seals against the top of the weir in the closed position, and the valve leaks.

Accordingly, there is a need for a weir-type diaphragm valve which avoids this problem with prior art weir-type diaphragm valves in a simple and relatively inexpensive manner.

SUMMARY

The invention satisfies this need. The invention is a weir-type diaphragm valve comprising a valve body, a flexible diaphragm and a valve stem and handle assembly. The valve body has an inlet end, an outlet end and an internal flow pass therebetween. A weir having an upstream face, a downstream face and a top edge is disposed transverse to the flow path. The top edge of the weir provides a valve seat having a raised transverse bead running substantially the entire length, along the top edge of the weir. The diaphragm is disposed above the valve seat. The diaphragm can be alternatively flexed between a closed diaphragm position, wherein the diaphragm is in tight abutment with the valve seat, and an open diaphragm position wherein the diaphragm is spaced apart from the valve seat. The valve stem and handle assembly is adapted to alternatively flex the diaphragm between the closed diaphragm position and the open diaphragm position.

By constructing the diaphragm valve with the bead rigidly disposed along the valve seat (instead of on the underside of the elastomeric diaphragm), the invention successfully avoids the leaking problems of prior art diaphragm valves.

DRAWINGS

These features, aspects and advantages of the present invention will become better understood with regard to the following description, appended claims and accompanying figures where:

FIG. 3 is a perspective view of the lower portion of the diaphragm valve illustrated in FIG. 1;

DETAILED DESCRIPTION

Figure 1:
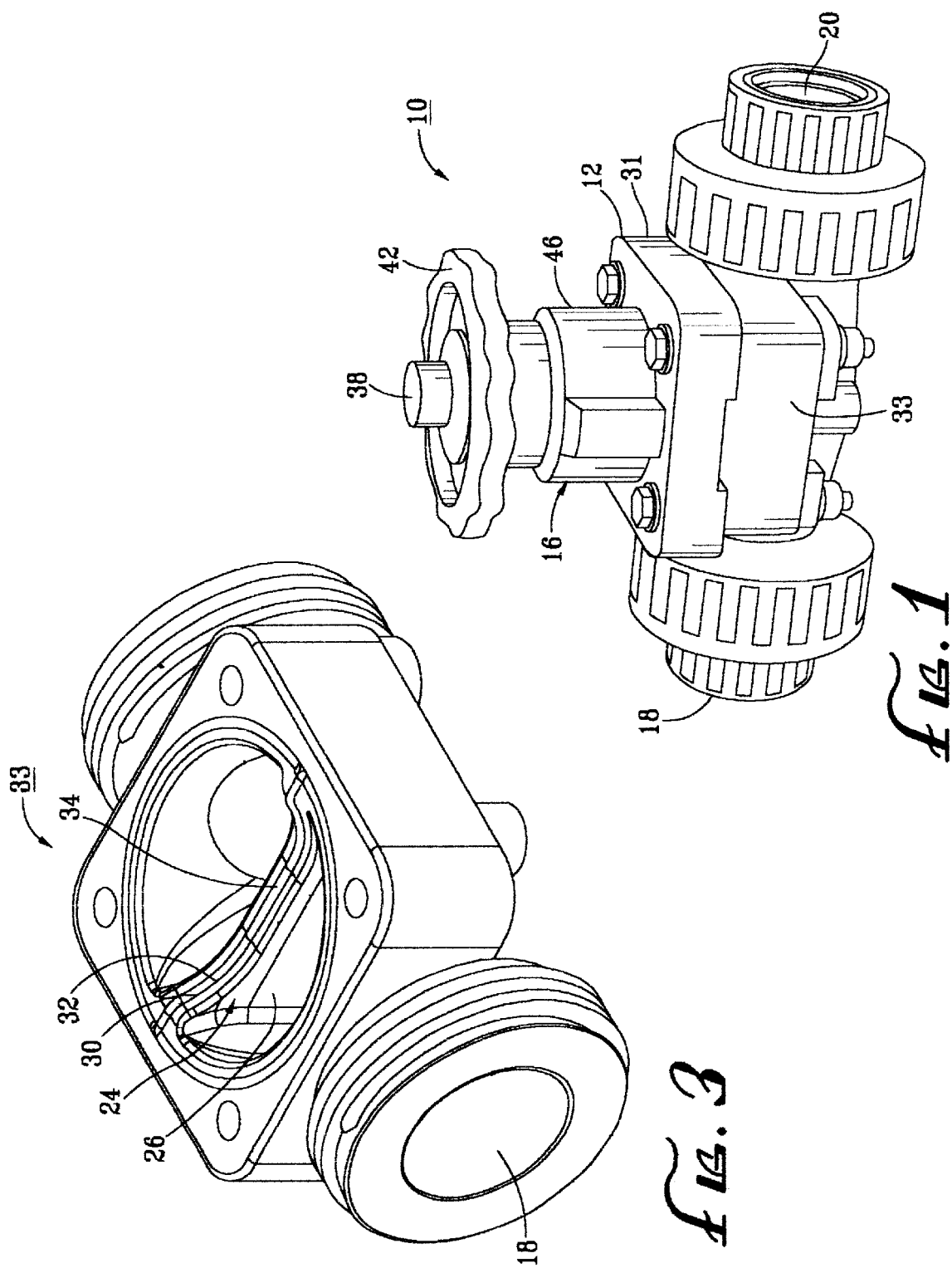
FIG. 1 is a perspective view of a weir-type diaphragm valve having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is an improved weir-type diaphragm valve 10 having a (i) valve body 12, (ii) a flexible diaphragm 14 and a (iii) valve stem and handle assembly 16.

The valve body 12 has an inlet end 18, an outlet end 20 and an internal flow path 22 therebetween. The valve body 12 also includes a weir 24 disposed transverse to the flow path 22. The weir 24 has an upstream face 26, a downstream face 28 and a top edge 30. The top edge 30 defines an elongate valve seat 32.

In the embodiment illustrated in the drawings, the valve body 12 is comprised of an upper portion 31 and a lower portion 33.

The valve body 12 can be made from any of a large number of suitable materials, depending upon the service for which it is to be used. Metals such as those made from steel, brass, cast iron, aluminum and titanium can be used. In many low pressure applications, the valve body 12 can be made from a plastic, such as polyvinylchloride (PVC), CPVC, polypropylene, tetrafluoroethylene (e.g., Teflon®), PVDF and polyethylene.

Figure 2:
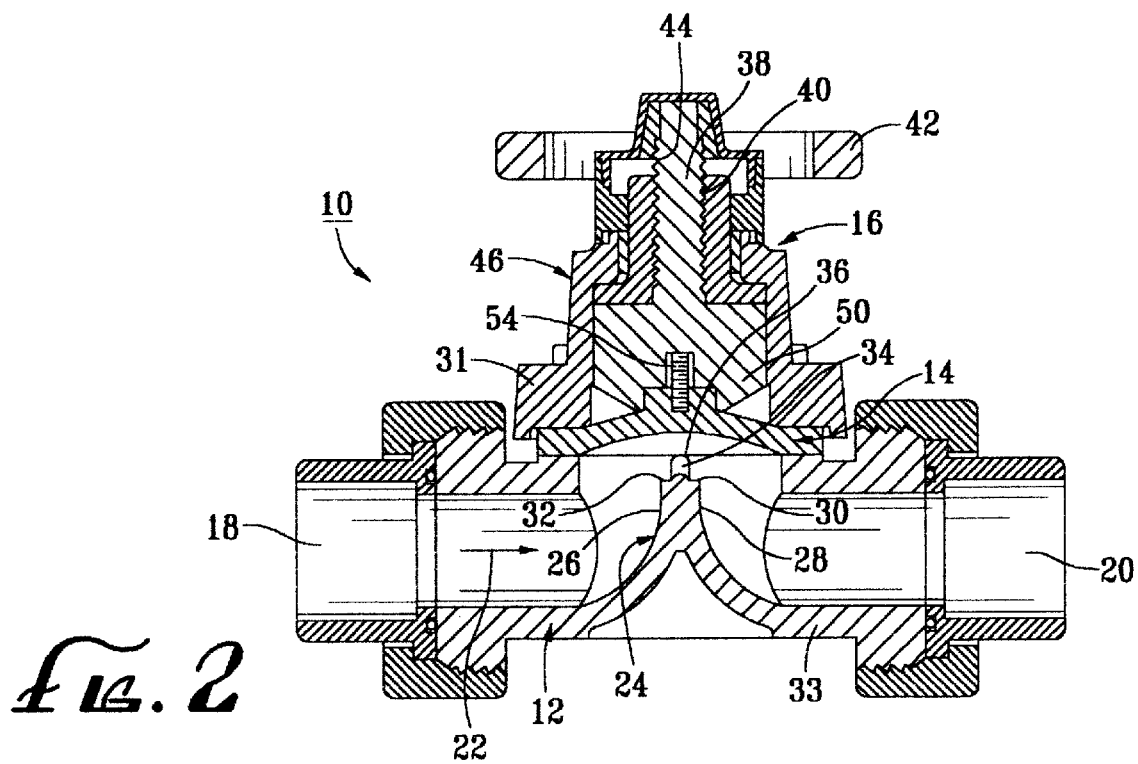
FIG. 2 is a cross-sectional side view of the diaphragm valve illustrated in FIG. 1.
Figure 4:
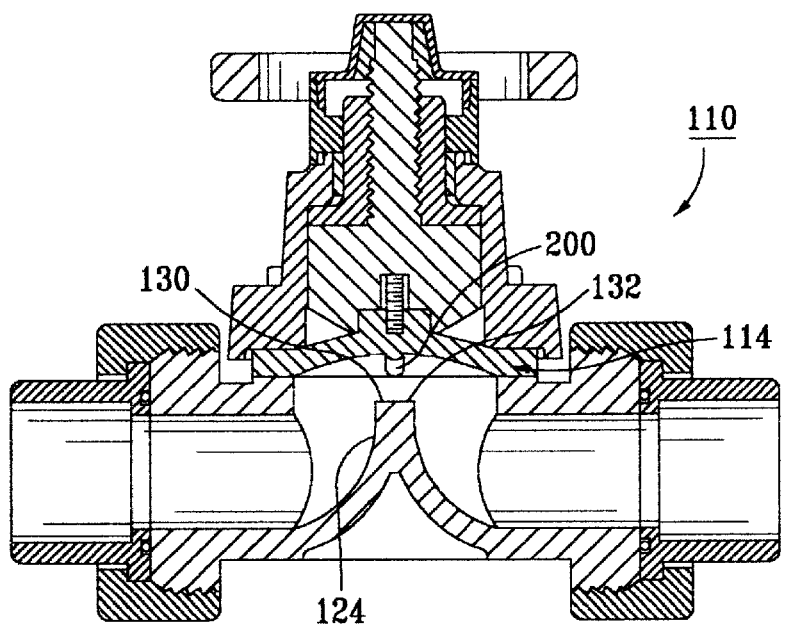
FIG. 4 is a cross-sectional side view of a diaphragm valve of the prior art.
Figure 5:
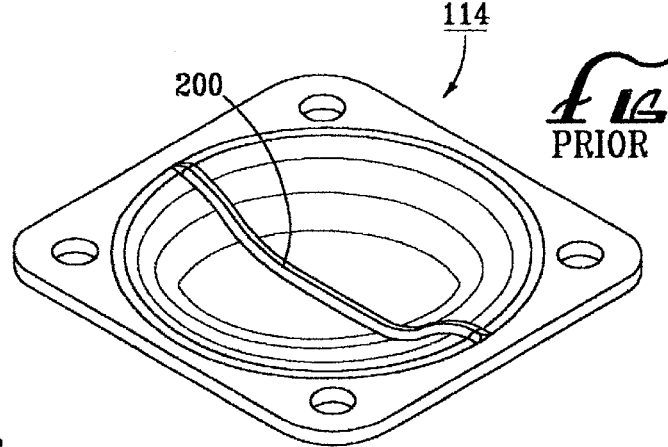
FIG. 5 is a perspective view of a diaphragm used in the wier-type diaphragm valve illustrated in FIG. 4.

The top edge 30 of the weir 24 comprises an upstream lower surface 60 and a downstream lower surface 62. Disposed between the upstream lower surface 60 and the downstream lower surface 62 is a raised bead 34 which extends substantially along the entire length of the top edge 30 of the weir 24. The raised bead 34 preferably has a rounded top portion 36. The radius of curvature of the top portion 36, measured at the central vertical cross-section, as illustrated in FIG. 2, is less than the radii of curvature in the upstream lower surface 60 and in the downstream lower surface 62 measured at the central vertical cross-section, as illustrated in FIG. 2. The raised bead 34 is typically between about 1/32 inch and 3/8 inch in height and is between 1/16 inch and 3/4 inch in width. It is also typical that the bead 34 be manufactured integral with the top edge 30 of the weir 24, but this is not critical. It is, however, important that the weir 24 be made of a rigid material, and that the bead 34 be rigidly attached to the weir 24. It is also preferable that the raised bead 34, itself, be substantially rigid as well.

The diaphragm 14 is disposed above the valve seat 32, typically in a generally horizontal disposition. The diaphragm 14 is flexible between a closed diaphragm position, wherein the diaphragm 14 is in tight abutment with the valve seat 32 (so that the flow path 22 is sealed closed) and an open diaphragm position wherein the diaphragm 14 is spaced apart from the valve seat 32 (so that the flow path 22 is open).

The diaphragm 14 is typically made from an elastomeric material, such as ethylene propylene, Viton®, Buna-N-, Hypmon® and Neoprenon. Diaphragms 14 made from tetrafluoroethylene have been found to be especially useful in the invention.

The valve steam and handle assembly 16 is adapted for alternatively flexing the diaphragm 14 between the closed diaphragm position and the open diaphragm position. Typically, the valve stem and handle assembly 16 includes a generally vertical valve stem 38 with exterior threads 40. Operatively attached near the top of the valve stem 38 is a valve handle 42, typically having interior threads 44 (see FIG. 1). As illustrated in FIG. 1, the valve stem and handle assembly 16 can include a valve stem and handle retainer structure 46 which is physically attached on the upper portion 31 of the valve body 12. By the rotation of the valve handle 42, therefore, the valve stem 38 is translated upwards or downwards. In a typical embodiment of the invention, such as that illustrated in the drawings, the downward translation of the valve stem 38 presses against the diaphragm 14 to flex the diaphragm 14 from the open position to the closed position. Conversely, the translating of the valve stem 38 in the upper direction allows the resiliency within the diaphragm 14 to return to the open diaphragm position.

In a typical embodiment, such as illustrated in FIG. 2, the valve stem and handle assembly 16 includes a valve stem plug 50 which is attached at the lower end 52 of the valve stem 38. Disposed vertically within the valve stem plug 50 is a plunger element 54 physically attached at the center of the top side of the diaphragm 14. As can be seen from FIG. 2, as the valve stem 38 is lowered, the valve stem plug 50 is lowered. The lowering of the valve stem plug 50 pushes downward on the plunger element 54 which depresses the diaphragm 14 downward towards the valve seat 32.

Figure 6:
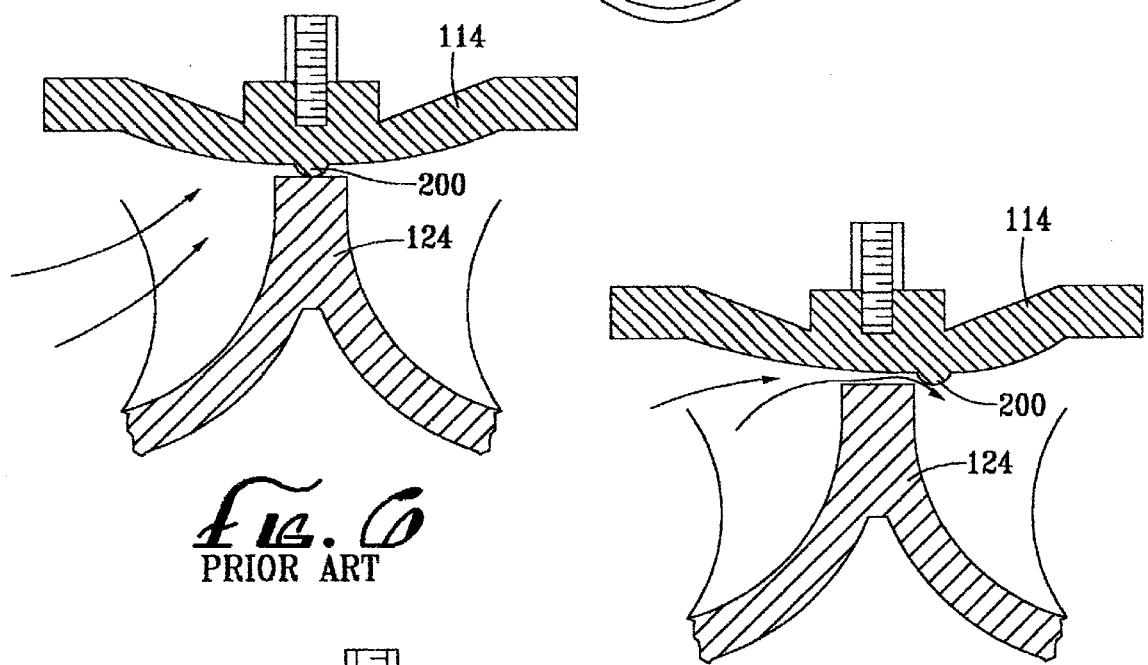
FIG. 6 is a cross-sectional side detail view illustrating the fluid forces applied to the weir-type diaphragm in the valve illustrated in FIG. 4.
Figure 7:
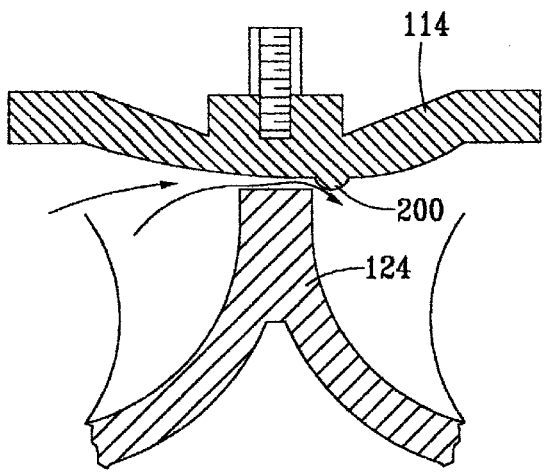
FIG. 7 is a cross-sectional side detail view of the weir-type diaphragm used in the diaphragm valve of FIG. 4, illustrating the effect of fluid forces in the displacement of the transverse bead on the underside of the diaphragm.

The invention provides a significant improvement over weir-type diaphragm valves of the prior art. As noted in the Background section, such, weir-type diaphragm valves 110 of the prior art are illustrated in FIGS. 4–7. In prior art valves of this type, the valve seat 132 at the top 130 of the weir 124 is substantially flat and the underside of the diaphragm 114 has a transverse diaphragm bead 200. However, the valve seat 132 at the top 130 of the weir 124 has no transverse bead. As illustrated in FIGS. 6 and 7, in such prior diaphragm valves 110, pressure imparted on the diaphragm bead 200 by fluid pressure tends to stretch the diaphragm 114 in the downstream direction, thereby tending to distort the bead 200 towards the downstream side of the top 130 of the weir 124. This is especially true for those portions of the bead 200 located between the outer edge of the diaphragm 114 and the plunger element. Over time, and/or under conditions of high pressure, the diaphragm bead 200 can be stretched completely off of the top 130 of the weir 124 (as illustrated in FIG. 7), thereby causing the valve 110 to leak.

Figure 8:
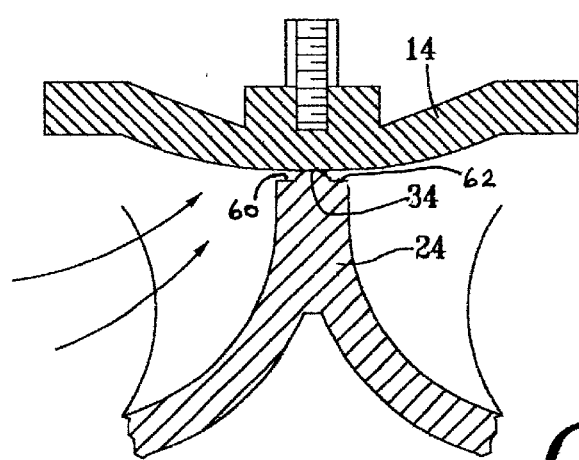
FIG. 8 is a cross-sectional side detail view of the weir and diaphragm of the diaphragm valve illustrated in FIG. 1.

By contrast, the transverse bead 34 used in the invention is fashioned within the top 30 the weir 24 itself. The weir 24 is rigid and the bead 34 is rigidly fixed within the weir 24. Since the weir 24 is not made from an elastomeric material, as is the diaphragm 14, pressure forces within the fluid does not distort the bead 34 in the downstream direction (as illustrated in FIG. 8). Thus, unlike weir-type diaphragm valves 110 of the prior art, weir-type diaphragm valves 10 of the invention will not leak due to downstream distortions of the transverse bead 34. Weir-type diaphragm valves 110 of the invention are typically capable of withstanding internal pressures as high as 25 psig, and can easily be constructed to withstand internal pressures as high as 100 psig or even as high as 300 psig.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A weir type diaphragm valve comprising:
   (a) a valve body having an inlet end, an outlet end and an internal flow path therebetween, the valve body including a weir disposed transverse to the flow path, the weir having upstream face, a downstream face and a top edge, the top edge defining an elongate valve seat, the top edge comprising a lower surface and a raised bead disposed above the lower surface and running along substantially the entire length of the top edge, the raised bead having an arcuate top surface with a radius of curvature measured at the central vertical cross-section which is less than the radii of curvature in the lower surface and in the downstream lower surface measured at the central vertical cross-section;
   (b) a flexible diaphragm disposed above the valve seat, the diaphragm being flexible between a closed diaphragm position wherein the diaphragm is in tight abutment with the valve seat so that the flow path is sealed closed and an open diaphragm position wherein the diaphragm is spaced apart from the valve seat so that the flow path is open; and
   (c) a valve stem and handle assembly for alternatively flexing the diaphragm between the closed diaphragm position and the open diaphragm position.

2. The diaphragm valve of claim 1 wherein the raised bead is between about 1/32" and about 3/8" in height above the lower surface.

3. The diaphragm valve of claim 1 wherein the raised bead is between about 1/16" and about 3/4" in width.

4. The diaphragm valve of claim 1 wherein the valve body is made of a plastic.

5. The diaphragm valve of claim 1 wherein the valve body is made of a polyvinyl chloride.

6. The diaphragm valve of claim 1 wherein the diaphragm is made from an elastomeric material.

7. The diaphragm valve of claim 1 wherein the diaphragm is made from tetrafluoroethylene.

8. The diaphragm valve of claim 1 wherein the diaphragm valve is capable of withstanding internal pressures at least as high as 25 psig.

9. The diaphragm valve of claim 1 wherein the diaphragm valve is capable of withstanding internal pressures at least as high as 150 psig.

10. The diaphragm valve of claim 1 wherein the diaphragm valve is capable of withstanding internal pressures at least as high as 300 psig.

11. The diaphragm valve of claim 1 wherein the lower surface comprises an upstream lower surface and a downstream lower surface, and wherein the raised bead is disposed between the upstream lower surface and the downstream lower surface and wherein the raised bead has a radius of curvature less than any radius of curvature in the upstream lower surface or in the downstream lower surface.

12. A weir type diaphragm valve comprising:
  (a) a valve body having an inlet end, an outlet end and an internal flow path therebetween, the valve body including a weir disposed transverse to the flow path, the weir having an upstream face, a downstream face and a top edge, the top edge defining an elongate valve seat, the top edge comprising an upstream lower surface, a downstream lower surface and a raised bead disposed between the upstream lower surface and the downstream lower surface and running along substantially the entire length of the top edge, the raised bead having an arcuate top surface with a radius of curvature measured at the central vertical cross-section which is less than the radii of curvature in the upstream lower surface and the downstream lower surface measured at the central vertical cross-section, the height of the raised bead being between about $1/32$" and about $3/8$" above the upstream lower surface and the downstream lower surface and the width of the raised bead between about $1/16$" and about $3/4$";
  (b) a flexible elastomeric diaphragm disposed above the valve seat, the diaphragm being flexible between a closed diaphragm position wherein the diaphragm is in tight abutment with the valve seat so that the flow path is sealed closed and an open diaphragm position wherein the diaphragm is spaced apart from the valve seat so that the flow path is open; and
  (c) a valve stem and handle assembly for alternatively flexing the diaphragm between the closed diaphragm position and the open diaphragm position.

13. The diaphragm valve of claim 12 wherein the valve body is made of a polyvinyl chloride.

14. The diaphragm valve of claim 12 wherein the diaphragm is made from tetrafluoroethylene.

15. The diaphragm valve of claim 12 wherein the diaphragm valve is capable of withstanding internal pressures at least as high as 25 psig.

16. The diaphragm valve of claim 12 wherein the diaphragm valve is capable of withstanding internal pressures at least as high as 150 psig.

17. The diaphragm valve of claim 12 wherein the diaphragm valve is capable of withstanding internal pressures at least as high as 300 psig.

18. The diaphragm valve of claim 12 wherein the valve body is made of a plastic.

\* \* \* \* \*